June 30, 1931. J. WHYTE 1,812,671
BRAKE
Filed June 11, 1928   2 Sheets-Sheet 2

Inventor:
John Whyte,
By Chindahl Parker Roulon
Attys.

Patented June 30, 1931

1,812,671

UNITED STATES PATENT OFFICE

JOHN WHYTE, OF BELOIT, WISCONSIN, ASSIGNOR TO WARNER ELECTRIC BRAKE CORPORATION, OF SOUTH BELOIT, ILLINOIS, A CORPORATION OF ILLINOIS

BRAKE

Application filed June 11, 1928. Serial No. 284,283.

This invention relates to improvements in brakes and more particularly to friction brakes of the so-called momentum type wherein a pair of coacting friction elements are adapted, when brought into gripping engagement, to derive an actuating force from the motion or momentum of a part to be braked, this force being augmented mechanically and applied to a friction brake associated with said part.

One object of the present invention is to provide a brake of the momentum type having its friction elements and parts of its force augmenting mechanism arranged in a novel manner and adapted for compact association with an internally expansible drum brake such as is particularly adapted for use on the wheel of an automotive vehicle.

Another object is to provide a momentum brake having a new and improved force-augmenting mechanism.

A further object is to provide a novelly arranged spring means for restoring the parts of a brake momentum operator to normal brake-released position.

Figure 1:
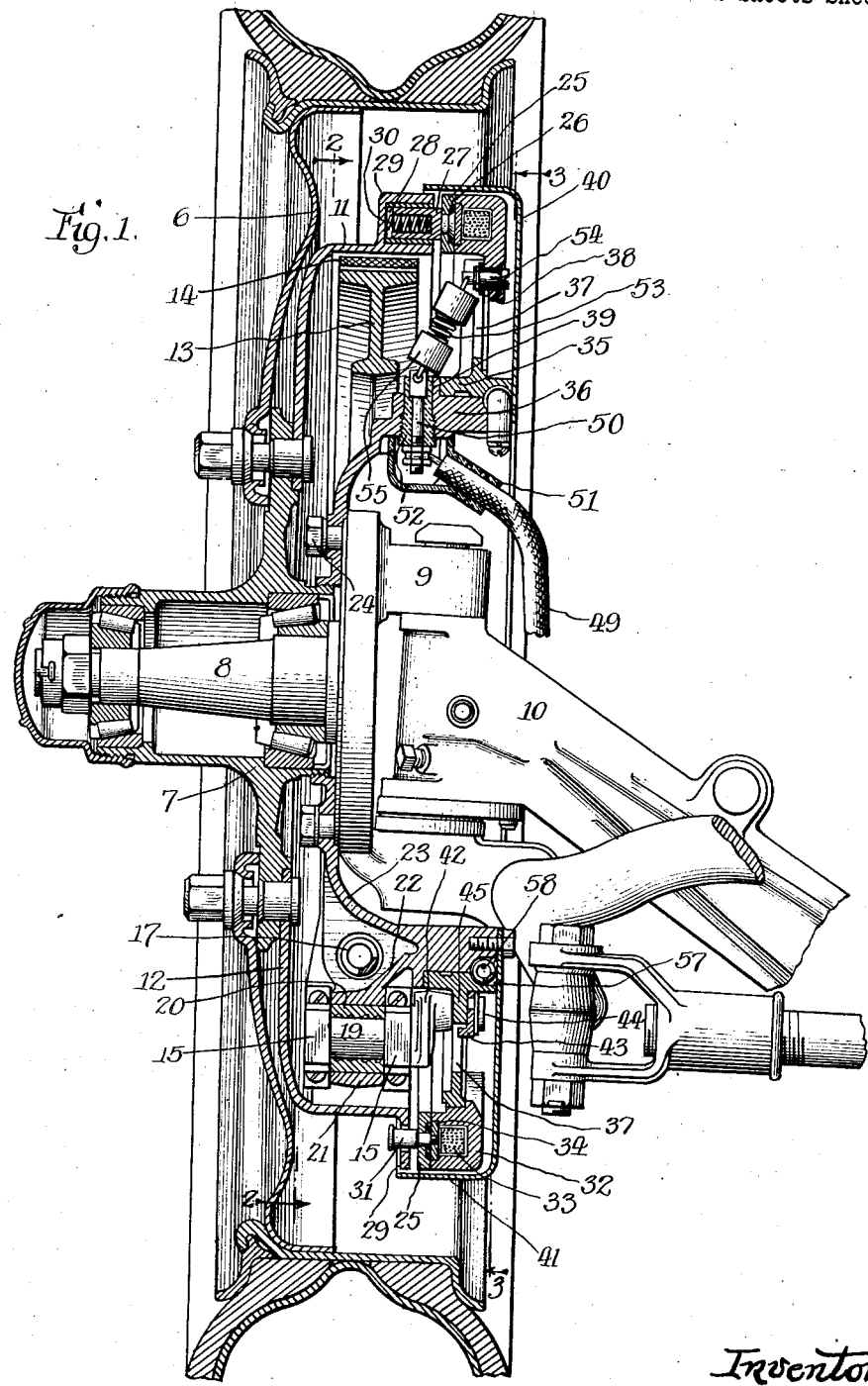
Figure 2:
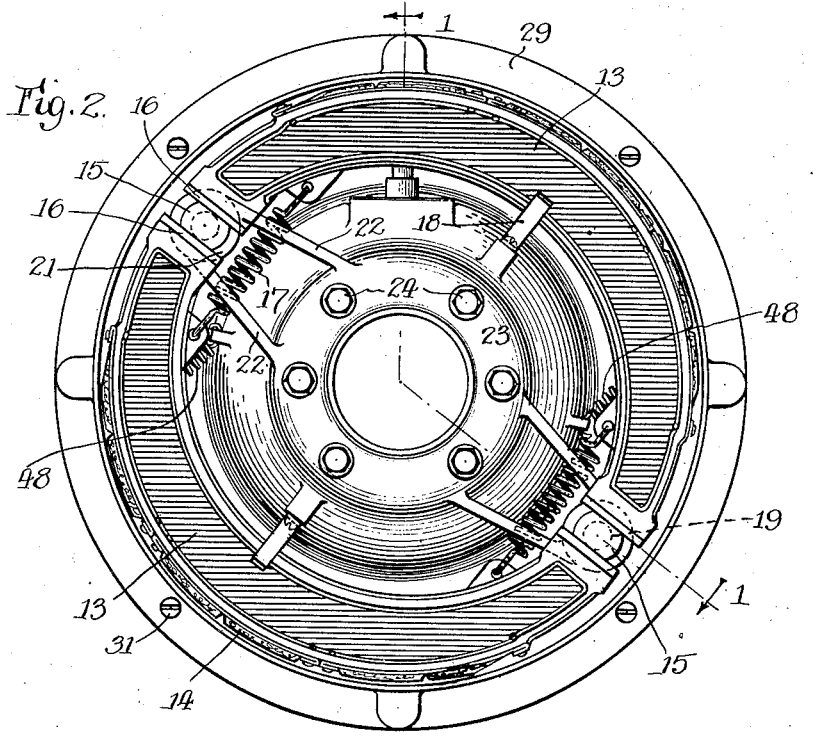

Other objects and advantages of the invention will become apparent from the following detailed description taken in connection with the accompanying drawings, in which Figure 1 is a sectional view of a vehicle wheel equipped with a brake embodying the features of the present invention, the section being taken along line 1—1 of Fig. 2.

Figure 3:
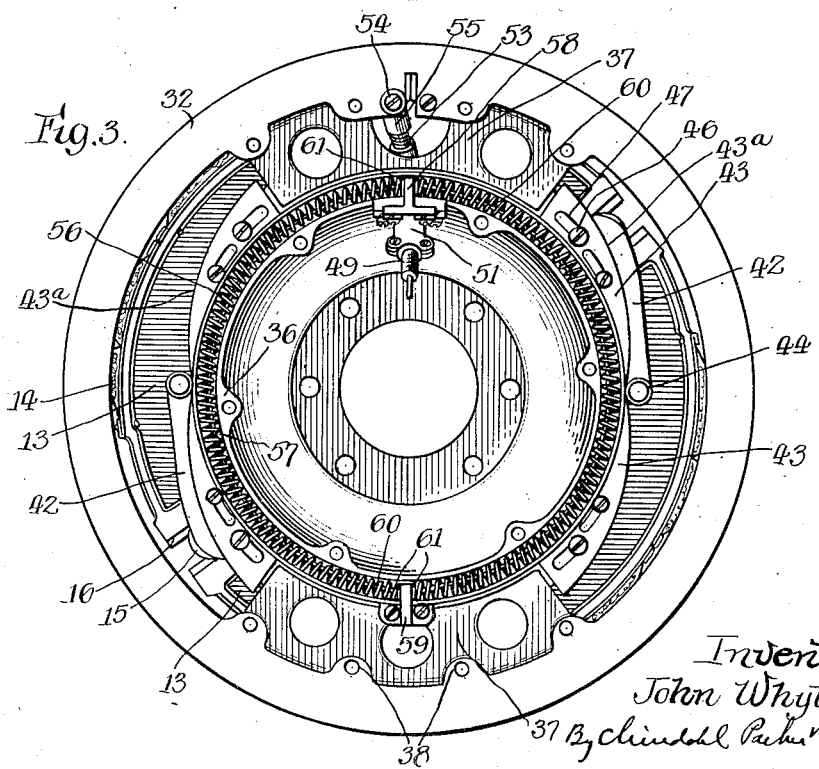

Figs. 2 and 3 are sectional views taken respectively along the lines 2—2 and 3—3 of Fig. 1.

While the invention is susceptible of various modifications and alternative constructions, I have shown in the drawings and will herein describe in detail the preferred embodiment, but it is to be understood that I do not thereby intend to limit the invention to the specific form disclosed but intend to cover all modifications and alternative constructions falling within the spirit and scope of the invention as expressed in the appended claims.

In its exemplary form illustrated in the drawings, the invention is embodied in a brake for a vehicle wheel 6 of the disk type.

The wheel is associated with a front axle assembly being carried by a hub 7 mounted through the usual bearings on the spindle 8 of a steering knuckle 9 which is pivoted on the end of the front axle 10.

The friction brake herein employed for arresting the motion of the wheel is of the expansible type including a drum 11 supported in the plane of rotation of the wheel as by bolting its end flange 12 to a flange on the wheel hub 7.

In the present instance the relatively stationary element of the brake comprises a pair of shoes 13 substantially semi-circular in form and arranged in end to end relation within the drum. Each shoe is of T-shaped cross section and constitutes a rigid backing for a covering 14 composed of wear and heat resistant friction material.

A common means is employed for expanding the shoes into braking engagement with the internal drum surface and for holding the shoes against rotation during such engagement. This means comprises a pair of expanding blocks 15 mounted for oscillation on a fixed axis, each being disposed between two adjacent separable end portions of the shoes 13. Preferably each cam block is formed in two parts (Fig. 1), each having straight parallel sides, the ends of which engage hardened plates 16 defining the adjacent ends of the shoes which are therefore spread apart when the cams are swung in either direction away from the normal brake-released position in which they are shown in Fig. 2. Springs 17 fastened at opposite ends of the shoes move the shoes bodily away from the drum surface as determined by the angular positions of the cams. A pair of stationary clips 18 (Fig. 2) cooperate with the shoes to hold them centered with respect to the drum.

The two parts of the cam blocks are integrally formed in coaxial alinement at opposite ends of a short rock shaft 19 which has bearing in a bushing 20 supported by a bearing 21 in a recess provided by bifurcating the adjacent ends of the brake shoes. The bearing is supported by two substantially radial arms 22 projecting in inclined relation to the plane of rotation of the wheel. These arms are formed integral with an annular anchoring member 23 secured by bolts 24 to the steering knuckle 9 and defining an inwardly opening recess of sufficient diameter as to receive the steering knuckle in its conventional location close to the plane of rotation of the wheel.

The friction operator for deriving the brake-actuating force from the momentum of the wheel and for augmenting this force for application to either of the cams 15 includes a pair of friction elements adapted to be brought into gripping engagement by energization of an electromagnetic winding associated with one of the elements. One of these elements rotates during motion of the vehicle and in the present instance comprises a substantially rigid ring 25 encircling the drum and having a plurality of segmental plates 26 secured in an annular groove therein and providing wear surfaces substantially flush with the flat inwardly facing surfaces of the ring.

Projecting rigidly from the ring 25 at annularly spaced points and on the side thereof opposite its friction surface are a plurality of studs 27, the ends of which are received in recesses 28 (Fig. 1) in a flanged portion 29 preferably formed integral with the drum around the outer periphery and near the open end thereof. Compression springs 30 seated in the recessed ends of the studs 27 and acting against the closed end of recesses 28 in the flange portion 29 constantly urge the ring in an axial direction away from the flange portion. The extent of this movement is determined by pins 31 (Fig. 1) carried by the ring and disposed in holes in the flange 29 smaller than the heads of the pins.

The driven element of the friction operator constitutes an extremely powerful electromagnet and in the form illustrated comprises a ring 32 of substantially U-shaped cross section and of the same diameter as the ring 25. A winding 33 comprising a series of turns of insulated wire is wound in the form of an annulus and disposed in an annular groove defined by the concentric flange portions of the ring 32. Wear plates 34 of non-magnetic material are secured to the magnet ring with their opposite edges seated on annular shoulders formed in the flanges of the ring. The end surfaces of the concentric ring flanges constitute magnetic pole faces which, it will be observed, are disposed opposite the corresponding surfaces of the ring 25, the latter therefore constituting an armature through which the magnetic flux produced by energization of the winding 33 may thread. The springs 30 resiliently urge the armature ring 25 toward the magnet ring and thus maintain intimate mechanical contact at all times between the wear plates of the two elements, thereby maintaining a flux path through the armature and the magnet core which is substantially closed at all times around the outer periphery of the magnet.

To support the magnet ring 32 opposite the armature for oscillatory movement about the drum axis, a spider is employed having a hub portion 35 rotatably mounted on the outer peripheral surface of a flange 36 formed on the anchor member 23 and two segmental arms 37 projecting from diametrically opposite sides of the hub portion. These arms are secured at their outer edges as by rivets to lugs 38 on the back of the magnet ring. To hold the spider against axial movement, the hub portion thereof is located between a shoulder 39 and an enclosing casing 40 having an outer flange 41 overlying the driving flange 29. Thus, the member 23 and the casing 40 cooperate to enclose the open end of the drum and all of the operating parts of the brake.

The frictional force rendered available by the gripping engagement of the rings 25 and 32 when the winding 33 is energized is, in the present instance, augmented mechanically and applied to the brake shoes by two mechanisms, one for oscillating each of the expanding cams 15. Each of these mechanisms comprises a crank arm 42 rigid with one of the cams 15 and a pair of plates 43 having cam surfaces 43ᵃ for engaging a roller 44 which projects laterally from the free end of the crank arm so as to overlie the surfaces 43ᵃ. The crank arm is angularly disposed relative to its expanding cam so as to extend circumferentially around the annular space defined by the drum and the hub portion 35 with the free end terminating near the inner circumference of this space.

The cam plates 43 are mounted on the spider so that their surfaces 43ᵃ form an inwardly converging notch terminating adjacent the periphery of the hub 35 and disposed, when the magnet is in brake-released position, about midway between the spider arms 37. To this end, the plates for each crank arm are secured to flanges 45 on the spider hub as by bolts 46 received through slots 47. Thus the plates are adapted for circumferential adjustment toward each other to vary the radial position of the point of convergence of their surfaces. By this arrangement the brake-released position of the expanding cam may be varied to reduce the clearance between the shoes and the drum after wearing off of the coverings 14 in service. Springs 48, extending between the crank arms and a lug on the anchor plate 23, act in tension on the crank arms 42 to swing them inwardly and thereby hold the rollers 44 against the cam surfaces.

It will be evident that with the cam and crank arrangement just described, both of the expanding cams 43 will move circumferentially with the supporting spider in the movement of the magnet ring away from its normal brake-released position. In such movement one or the other of the plates will act on its roller 44 to move the same radially outward regardless of the direction of motion of the magnet as determined by the rotation of the vehicle wheel at the time when the magnet is energized. Through the medium of the sloping cam surfaces and the bell crank action of the arms 42, a powerful force-augmenting connection is provided which has a short range of radial operating movement and therefore can be accommodated in the narrow annular space between the drum and the steering knuckle recess. A further augmentation of the actuating force is effected by applying the force derived through the frictional engagement of the magnetic elements and the crank arms 42 at points disposed a substantial distance inwardly from the magnet.

As shown in Fig. 3, the expanding cams 15 are located close to the spider arms 37 when the latter are in brake-released position and the arms 42 extend circumferentially away from the respective arms 37, thereby allowing for a wide range of movement of the spider in either direction from brake-released position without interference by the rollers 44. Thus the rollers may be positioned in the path of the arms 37, as shown in Fig. 1, which permits the magnet to be located close to the open end of the drum. This arrangement makes for a small axial dimension of the brake unit. The arms 22 provide extremely rugged supports for the expanding cams without interfering in any way with the oscillatory movement of the spider supporting the magnet.

Current for energizing the magnet may be supplied from a storage battery to the winding 33 through a grounded conductor including the vehicle frame and an insulated conductor 49 connected to a binding post 50 enclosed by a cap 51 in the steering knuckle recess. The post extends through an insulated bushing 52 and is connected to one end of a resilient coiled conductor 53 to allow for oscillation of the magnet while maintaining the energizing circuit. At its opposite end this conductor is attached to a binding post 54 connected to the insulated terminal end of the winding 33. Caps 55 of insulating material are provided at the ends of the coil 53 to prevent short circuiting. Any suitable means such as a rheostat may be employed for controlling the degree of energization of the winding 33.

When the magnet is energized, the force of magnetic attraction causes axial gripping engagement of the rings 25 and 32, the friction force thus provided serving to move the magnet and therefore its supporting spider angularly in the direction of rotation of the wheel. In this movement both of the arms 42 are swung outwardly by the cam plates, thereby expanding the plates 13 and pressing the coverings 14 into direct engagement with the drum. After the normal shoe clearance has been taken up, the magnet slips relative to its armature, the brake being held applied until the wheel has come to rest.

To restore the operating parts to normal brake-released position after movement in either direction to set the brake, a pair of coiled compression springs 56 (Fig. 3) are employed in the present instance. These springs are semi-circular in form and are disposed in end to end relation in a groove 57 formed in the member 23 and the spider hub 34. Two of the adjacent ends of the springs abut against a non-rotatable stop 58 rigid with the flange 36 of the anchor member 23. A movable stop 59 is carried by the spider hub 36 and is disposed between the movable ends of the springs.

The springs are place under a predetermined compressive stress and therefore exert opposed forces acting to hold the spider in brake-released position when the magnet is deenergized. In the movement of the magnet in either direction away from released position, the stop 59 compresses one of the springs which spring becomes active upon the deenergization of the magnet and the tangential force applied thereby restores the spider to normal position. To prevent the inactive spring, due to its initial compression, from exerting a counteracting force while the active spring is restoring the magnet to released position, means is provided for preventing expansion of the springs beyond their normal lengths. In the present instance, this means comprises a flexible cable 60 extending through each spring and carrying end stops 61 adjacent the stops 58 and 59. The cable being non-extensible prevents expansion of its spring.

I claim as my invention:

1. A brake of the momentum type for a dirigible vehicle wheel comprising, in combination, a drum carried on the inner side of said wheel, a non-rotatable member having a peripheral flange portion cooperating with said drum to define an annular space within the drum, said member providing a central inwardly opening recess receiving the steering knuckle of said wheel, braking means disposed in said annular space and having adjacent separable end portions, expanding means associated with said end portions including a crank arm disposed in and extending circumferentially of said annular space, an annular driving surface rotatable with said drum, an annular driven surface adapted for axial engagement with said driving surface, and means rigid with said driven surface and providing in said annular space two converging cam surfaces movable circumferentially in either direction away from a normal brake-released position to move said crank arm in one direction.

2. A brake of the momentum type comprising, in combination, a rotatable drum, braking means within said drum having adjacent end portions to be spread apart in the setting of said brake, expanding means associated with said end portions including an oscillatory crank arm, a pair of coacting friction elements mounted externally of said drum, one being rotatable with the drum, the other being mounted for oscillatory movement about the drum axis, and means rigid with said driven element and providing a pair of circumferentially movable and converging cam surfaces within the circumference of said drum, said surfaces being operable on the free end of said crank arm to oscillate the arm in one direction in the movement of said driven element in either direction away from its normal brake-released position.

3. A brake of the momentum type comprising, in combination, a rotatable drum, braking means within said drum having adjacent end portions to be spread apart in the setting of said brake, expanding means associated with said end portions and having a member movable radially outward to set the brake, a pair of friction elements adapted for axial gripping engagement, one being rotatable with said drum, the other being mounted for oscillation about the drum axis, and a circumferentially movable cam rigid with said driven element and having inwardly converging surfaces acting to force said member outwardly in the movement of said driven element in either direction away from its brake released position.

4. A brake of the momentum type comprising, in combination, a rotatable drum, braking means within said drum having adjacent end portions to be spread apart in the setting of said brake, expanding means associated with said end portions and having a member movable radially to set the brake, a pair of friction elements disposed externally of said drum and adapted for axial gripping engagement, one being rotatable with said drum, a hub within the circumference of said drum mounted for oscillation about the drum axis, spaced radial arms rigid with said hub and supporting said other element, and a cam carried by said hub and providing converging surfaces intersecting substantially midway between said arms and operable to move said member in one direction in either direction of movement of said driven element away from its brake-released position.

5. A brake of the momentum type comprising, in combination, a rotatable drum, friction means within said drum, expansible means extending circumferentially around said drum and operable when expanded to press said friction means against the internal drum surface, said expanded means having adjacent separable end portions, an oscillatory cam disposed between said end portions, a crank arm rigid with said cam and extending substantially perpendicular to the axis thereof and located close to said expansible means, supporting means for said cam permitting the location of said crank arm closely adjacent said expansible means, and a momentum operator for actuating said crank arm including a driven friction member mounted for oscillation about the drum axis.

6. A friction brake of the momentum type comprising, in combination, a rotatable drum having an internal cylindrical surface, friction means within said drum, expansible means extending circumferentially around said drum for pressing said friction means into braking engagement with said surface, said expansible means having adjacent separable end portions, an expanding cam mounted between said end portions to swing on a fixed axis, a crank arm rigid with said cam and extending along said expansible means adjacent thereto, means disposed externally of said drum and providing an annular friction surface, a ring mounted for axial engagement with said annular surface, and an arm for supporting said ring for oscillatory movement and movable circumferentially beyond the axis of said cam in the application of said brake, and means operable to transmit the oscillatory movements of said ring to said crank arm.

7. A friction brake of the momentum type comprising, in combination, a rotatable drum, braking means engageable therewith, means operable to derive an actuating force from the momentum of the part to be braked including a friction element angularly movable in opposite directions away from a normal brake-released position, and means for restoring said element to brake-released position after movement in either direction to set the brake, said restoring means comprising a pair of compression springs acting independently and in opposite directions to move said element toward said released position.

8. A friction brake of the momentum type comprising, in combination, a rotatable drum, braking means engageable therewith, means operable to derive an actuating force from the momentum of the part to be braked including a friction element angularly movable in opposite directions away from a normal brake-released position, means for restoring said element to brake-released position after movement in either direction to set the brake, said restoring means comprising a pair of compression springs acting independently and in opposite directions to move said element toward said released position and means for preventing the action of one of said springs on said element when the element is out of brake-released position.

9. A friction brake of the momentum type comprising, in combination, a rotatable drum, braking means engageable therewith, means operable to derive an actuating force from the momentum of the part to be braked including a friction element angularly movable in opposite directions away from a normal brake-released position, and compression spring means operable to exert forces on said element to restore the same to brake-released position after movement in either direction away from such position.

10. A friction brake of the momentum type comprising, in combination, a rotatable drum, braking means engageable therewith, means operable to derive an actuating force from the momentum of the part to be braked including a friction element angularly movable in opposite directions away from a normal brake-released position, compression spring means operable to exert forces on said element to restore the same to brake-released position after movement in either direction away from such position, and means to prevent expansion of said spring means beyond said brake-released position.

11. A brake of the momentum type for a vehicle wheel swiveled on a steering knuckle comprising, in combination, a drum carried on the inner side of said wheel, an annular non-rotatable member defining an inwardly opening recess accommodating said knuckle and cooperating with said drum to define an annular space of relatively narrow radial width and within said drum, expansible braking means extending around said annular space, a pair of annular friction elements disposed externally of said drum and adapted to derive an actuating force from the momentum of the vehicle, and means operated from the driven friction element and arranged to apply the actuating force to said braking means at a point within the drum circumference.

In testimony whereof, I have hereunto affixed my signature.

JOHN WHYTE.